(12) United States Patent
Ebert

(10) Patent No.: US 10,145,667 B2
(45) Date of Patent: Dec. 4, 2018

(54) SHAFT ROUNDNESS GAUGE

(71) Applicant: James L. Ebert, Huron, OH (US)

(72) Inventor: James L. Ebert, Huron, OH (US)

( * ) Notice: Subject to any disclaimer, the term of this patent is extended or adjusted under 35 U.S.C. 154(b) by 133 days.

(21) Appl. No.: 15/455,940

(22) Filed: Mar. 10, 2017

(65) Prior Publication Data

US 2018/0259313 A1 Sep. 13, 2018

(51) Int. Cl.
*G01B 3/34* (2006.01)
*G01B 5/20* (2006.01)

(52) U.S. Cl.
CPC ............. *G01B 5/201* (2013.01); *G01B 3/34* (2013.01)

(58) Field of Classification Search
CPC ................................. G01B 5/201; G01B 3/34
USPC ............................... 33/517, 550, 555.1
See application file for complete search history.

(56) References Cited

U.S. PATENT DOCUMENTS

| | | | | |
|---|---|---|---|---|
| 1,888,416 A | * | 11/1932 | Williams | G01B 3/20 33/544.5 |
| 2,863,223 A | * | 12/1958 | Reicherter | G01B 5/08 33/555.1 |
| 3,861,048 A | * | 1/1975 | Thompson | G01B 3/24 116/292 |
| 4,905,378 A | * | 3/1990 | Culver | G01B 3/28 33/531 |
| 5,446,774 A | * | 8/1995 | Russell | G21C 7/16 33/533 |
| 5,870,835 A | * | 2/1999 | Stieff | G01B 3/28 33/203.11 |
| 7,197,837 B1 | * | 4/2007 | Blanford | G01B 5/003 33/555.1 |
| 2012/0011734 A1 | * | 1/2012 | Haller | G01M 13/04 33/517 |
| 2013/0067760 A1 | * | 3/2013 | Husted | G01B 5/06 33/784 |
| 2013/0219731 A1 | * | 8/2013 | Zhang | G01B 5/252 33/550 |
| 2015/0196958 A1 | * | 7/2015 | Ebert | B23B 5/04 29/402.06 |
| 2015/0204642 A1 | * | 7/2015 | DeYaeger | G01B 3/36 33/199 R |
| 2018/0106587 A1 | * | 4/2018 | Veit | G01B 5/201 |

* cited by examiner

*Primary Examiner* — G. Bradley Bennett
(74) *Attorney, Agent, or Firm* — David D. Murray; Vivacqua Law, PLLC

(57) ABSTRACT

A shaft roundness gauge measures the roundness (or lack thereof) of a surface such as a bearing surface of a shaft or axle of a truck, tractor or trailer. The gauge comprehends a plurality of specifically sized rings or collars having inner diameters which correspond to common outside diameters of shafts, axles and other circular or cylindrical components. The ring includes a radial opening which receives a collet fitting which receives a probe housing of a dial indicator. A collet clamp may be tightened to secure the dial indicator to the ring. The ring and dial indicator are positioned on a shaft, at that position where the shaft or component is believed to be least worn. The dial indicator is zeroed and then the assembly is rotated around the shaft or component to determine, by the reading of the dial indicator, the location of and the extent of wear of the shaft or component.

18 Claims, 5 Drawing Sheets

SHAFT ROUNDNESS GAUGE

FIELD

The present disclosure relates to gauges for measuring roundness and more particularly to a roundness gauge assembly having a plurality of dedicated variously sized rings and a dial indicator for measuring the roundness of shafts, axles and similar components.

BACKGROUND

The statements in this section merely provide background information related to the present disclosure and may or may not constitute prior art.

Load bearing shafts are often subjected to unequal and constant loads in bearings and guides which wear the surface of the shafts unevenly. This problem is especially acute with truck, tractor and trailer shafts (axles) that are essentially constantly loaded in one direction due to the weight and load of the truck, tractor or trailer. Other than the wear caused by the essentially vertical vehicle load which wears the bottom surface (at the nominal 6:00 o'clock position) of the shaft or axle, some slight additional wear may be experienced by the surfaces adjacent the bottom surface due to acceleration and braking of the truck, tractor or trailer.

This wear pattern represents a measurement and computational challenge because the shaft or axle may appear to be unworn if measured horizontally with a standard micrometer but highly worn if measured vertically with the same instrument. Determining the actual wear, as well as the location of the wear, of the shaft or axle from these two divergent measurements has proven difficult.

The present invention addresses this measurement problem.

SUMMARY

The present invention provides a shaft roundness gauge adapted to measure the roundness (or lack thereof) of a surface such as a bearing surface of a shaft such as an axle or a truck, tractor or trailer. The invention comprehends a plurality of specifically sized rings or collars having inner diameters which correspond to common outside diameters of shafts, axles and other round members subject to wear. The ring includes a radial through opening which receives a collet which, in turn, receives the probe housing of a radially oriented dial indicator. The collet may be tightened by a collet clamp to secure the dial indicator to the ring. So configured, the ring and dial indicator are positioned on a shaft, preferably with the dial indicator at the 12:00 o'clock position, or that position where the shaft or circular member is believed to be least worn (or most round). The dial indicator is zeroed and then the assembly is rotated around the shaft or member to determine, by virtue of the reading of the dial indicator, the location of and the extent of wear of the shaft or member. Intermediate measurements at other circumferential locations may, of course, also be taken to determine the roundness of the shaft or member and the total extent of and circumferential location of the wear.

Thus it is an aspect of the present invention to provide a shaft roundness gauge.

It is a further aspect of the present invention to provide a shaft roundness gauge having a plurality of rings having diameters which correspond to common outside diameters of shafts, axles and other round members.

It is a still further aspect of the present invention to provide a shaft roundness gauge having a dial indicator.

It is a still further aspect of the invention to provide a shaft roundness gauge having a collet which receives a probe housing of a dial indicator.

It is a still further aspect of the present invention to provide a shaft roundness gauge having a collet and collet clamp which secures the probe housing of a dial indicator to a ring or collar sized to fit on a given shaft.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
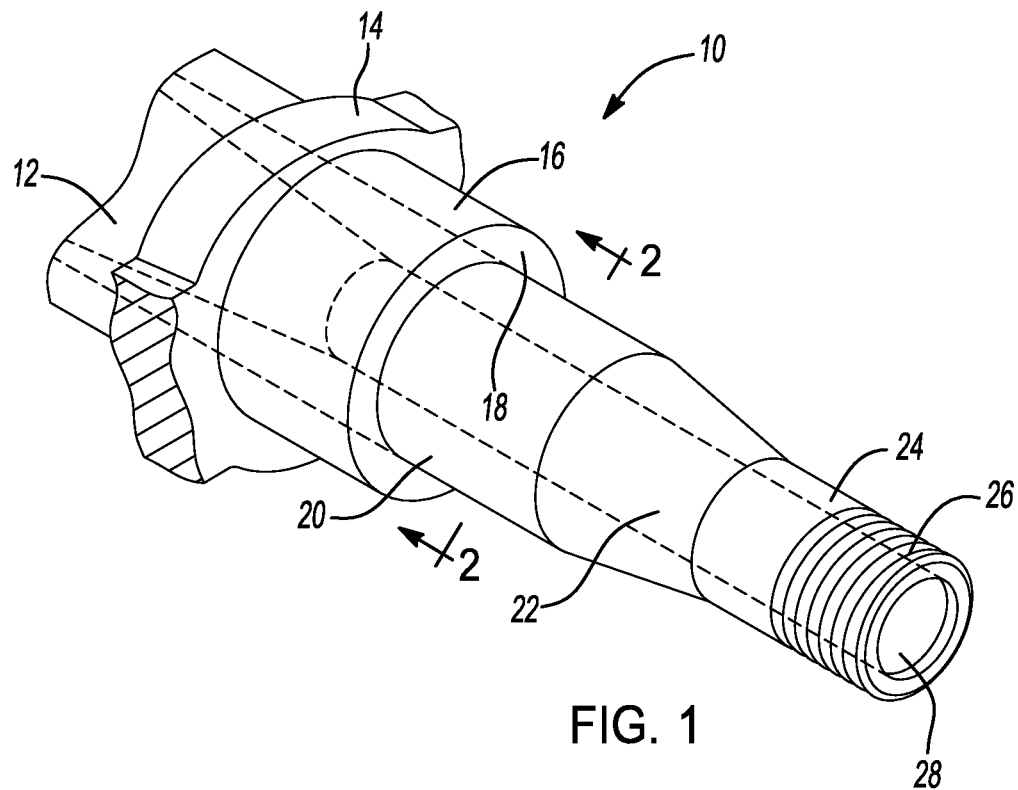
FIG. 1 is a perspective view of a typical and exemplary shaft, such as a motor vehicle truck axle, having worn bearing surfaces.

With reference to FIG. 1, a typical and exemplary shaft, namely a motor vehicle axle for a truck, tractor or trailer is illustrated and generally designated by the reference number 10. The axle 10 is an elongate structure having a major, larger diameter portion 12 that is secured to suspension components of a truck, tractor, trailer of other motor vehicle (all not illustrated). The axle may include a brake spider 14 that receives and mounts components of the vehicle brake system (also not illustrated). Typically on the larger diameter portion, there resides an oil seal surface 16 adjacent a diameter reducing shoulder or step 18. Adjacent the shoulder or step 18 is a first or inner bearing surface 20. The inner bearing surface 20 receives and supports a first or inner ball bearing assembly which, in turn, rotatably supports a wheel hub (both not illustrated). Adjacent the inner bearing surface 20 is a tapered region 22 and adjacent the tapered region 22 is a second or outer bearing surface 24. Like the inner bearing surface 20, the outer bearing surface 24 receives and supports a second or outer ball bearing assembly (not illustrated) which, in turn, rotatably supports the wheel hub. The axle 10 illustrated defines an inner bearing surface 20 having a diameter larger than the diameter of the outer bearing surface 24. While this is the more common axle bearing surface configuration, it should be understood that certain axles define inner and outer bearing surfaces of the same diameter and it should be appreciated that the present invention is equally suited for and useable with both of these axle configurations. Finally, the axle 10 includes a threaded terminal portion 26 which receives a complementarily threaded nut which secures the wheel hub to the axle. The axle may be either solid or hollow. If the axle 10 is hollow, an elastomeric plug 28 may be disposed in the hollow end to retain lubricant therein.

Figure 2:
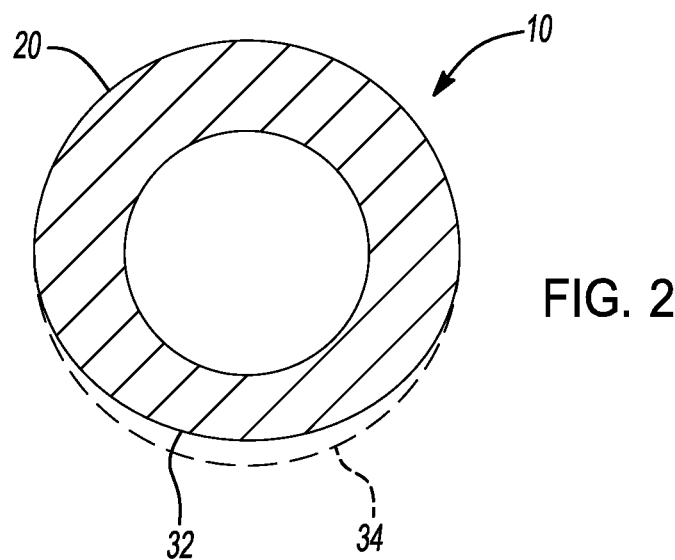
FIG. 2 is an enlarged, full sectional view of the typical and exemplary shaft having worn bearing surfaces taken along line 2-2 of FIG. 1.

Referring now to FIGS. 1 and 2, the axle 10 is shown in full section across the inner bearing surface 20. As noted above, the inner bearing surface 20 is worn and therefore out of round. The worn portion 32 of the inner bearing surface 20 is shown by the inner solid line which is radially inward of the dashed line 34 representing the original or unworn circular outer bearing surface 24. The wear, that is, the uneven diametral reduction of the inner bearing surface 20 is enhanced for purposes of clarity in FIG. 2. Depending upon the nature of the shaft or axle 10 and its service and thus its acceptable or unacceptable wear, the worn portion 32 may be 5 thousandths of an inch (0.005 inches), 10 thousandths of an inch (0.010 inches) or more smaller than the nominal outside diameter of the shaft or axle 10. Typically, and especially it the shaft or axle 10 is a motor vehicle axle, the wear will be a maximum at the bottom, six o'clock position as illustrated in FIG. 2, the arrow UP indicating the 12:00 o'clock position of the installed axle 10 and will gently taper in both direction to essentially zero. Also, if the shaft or axle 10 is a truck axle, it has been determined that the preferable maximum wear is approximately 5 thousandths (0.005 inches) and that such wear will reduce to 3 thousandths at the 5:00 o'clock and 7:00 o'clock positions (30° right and left of bottom center) and to a thousandth or less near the 3:00 o'clock and 9:00 o'clock positions (90° right and left of bottom center).

Figure 3:
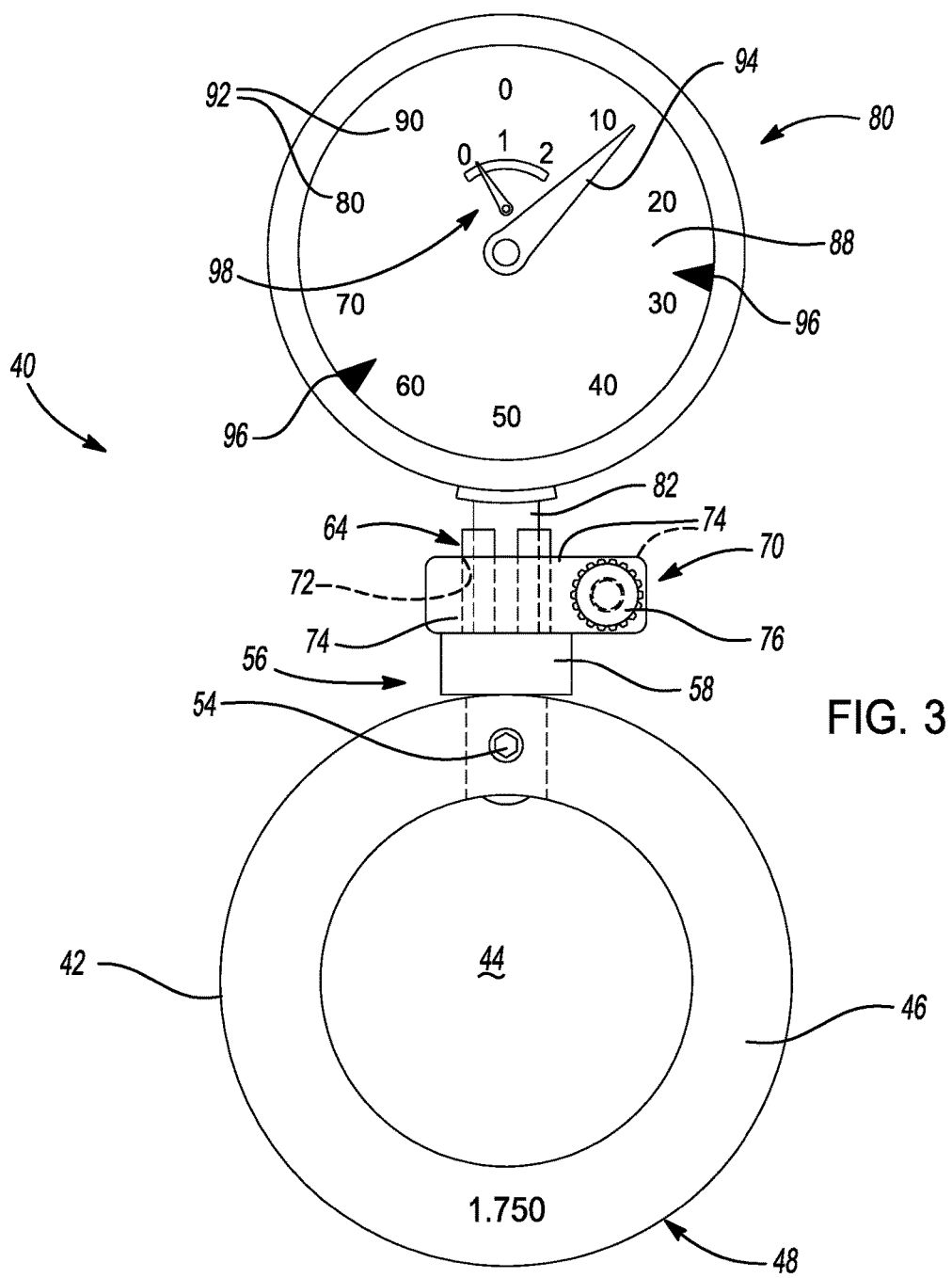
FIG. 3 is a front view of a roundness gauge according to the present invention.
Figure 4:
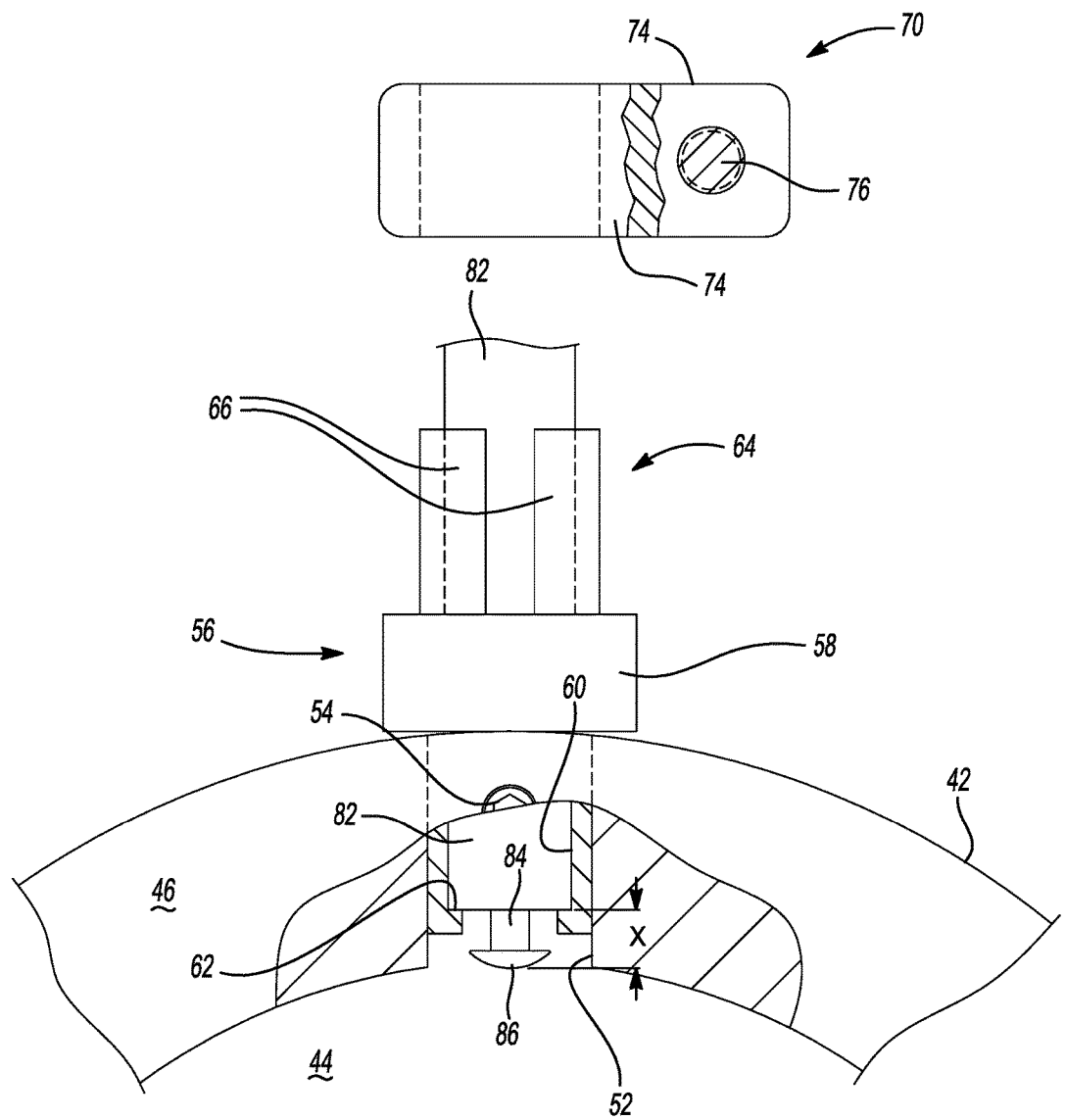
FIG. 4 is an enlarged, fragmentary view of a portion of the roundness gauge ring or collar according to the present invention with a portion broken away.

Referring now to FIGS. 3 and 4, a roundness gauge according to the present invention and especially suited to measuring wear on shafts and axles is illustrated and generally designated by the reference number 40. The roundness gauge 40 includes a circular collar or ring 42 having a center, through cylindrical opening 44 of a specific diameter such as 1.750 inches, 2.625 inches or 3.25 inches which corresponds to a specific outside diameter of a bearing surface such as the bearing surfaces 20 and 24 illustrated in FIG. 1. Preferably, though not necessarily, an outer, flat surface 46 of the collar or ring 42 may include indicia 48 providing the size of the cylindrical opening 44 in inches, for example, 1.750, or, as the case may be, in millimeters. Secured to the ring or collar 42 in a radial opening 52 by a transversely disposed set screw 54 or other similar fastener is a radially disposed cylindrical collet fitting 56.

The cylindrical collet fitting 56 includes an enlarged, center portion 58 which acts as a stop to position and limit radially inward translation of the cylindrical collet fitting 56 against the outer surface of the collar or ring 42. The cylindrical collet fitting 56 itself defines a through cylindrical opening or counterbore 60 which terminates in a flange or shoulder 62 at its inner terminus proximate the cylindrical opening 44 of the ring or collar 42. The cylindrical collet fitting 56 also includes a collet 64 having a plurality of curved tangs or leafs 66. Surrounding the collet 64 is a clamp 70 having a cylindrical opening 72 that snugly receives the tangs or leafs 66 of the collet 64. The clamp 70 includes two spaced apart arms or extensions 74 that may be translated toward and away from one another by a thumbscrew 76 which extends transversely between them to tighten and loosen the collet tangs or leafs 66.

The roundness gauge 40 also includes a dial indicator 80 having a cylindrical radially oriented measurement probe sheath or housing 82 and a measurement probe 84 slidingly disposed therein. The measurement probe 84 terminates in a hemi-spherical cap or tip 86 that facilitates measurement of the shafts and axles upon which it is utilized. The dial indicator 80 includes a face 88 having graduations 92 thereabout from 0 to 100 arranged equally and circumferentially about the face 88 which represent thousandths (0.001) of an inch (0.0254 mm.). The dial indicator 80 includes a pointer or needle 94 coupled to an internal mechanism that, in conventional fashion, converts linear motion of the measurement probe 84 to calibrated rotation of the pointer or needle 94. Optionally, the dial indicator 80 may include one or more moveable limit or memory hands 96 that can be adjusted to record the initial (or other significant) position of the pointer or needle 94. The dial indicator 80 may also include an additional, inset scale and pointer 98 that indicates measurements in excess of 100 thousandths (2.54 mm.). In this application, concerned as it is with out of roundness and wear on the scale of 5, 10, 15 or 20 thousandths (0.005, 0.010, 0.015 or 0.020 inches (0.127, 0.254, 0.381, or 0.508 mm.)), this feature is generally unnecessary.

Referring now to FIGS. 1 and 3, the method of measuring roundness of a shaft, axle 10 or other circular or cylindrical component will now be described. At the outset, it is necessary to know the nominal outside diameter of the shaft, axle 10 or other component to be measured. Based upon this information, a proper ring or collar 42 having a corresponding through opening 44 diameter is selected and the dial indicator 80 is assembled thereto by installing the probe housing 82 into the opening 60 of the cylindrical collet fitting 56 and seating it against the flange or shoulder 62, ensuring proper location of the tip 86 of the probe 84 relative to the indie surface of the through opening 44 of the ring or collar 42. The thumbscrew 76 is then tightened. So assembled, the tip 86 of the measurement probe 84 of the dial indicator 80 protrudes approximately 30 thousandths (0.030 inches (0.762 mm.)) into the circular opening 44 of the selected collar or ring 42. Given its hemispherical shape and its axial depth of 50 thousandths (0.050 inches (1.27 mm.)), the probe tip 86 will readily translate radially as the roundness gauge 40 is placed upon a shaft, axle 10 or other component. Next, the roundness gauge 40 is rotated to a position where the shaft, axle 10 or component is not worn. In the case of a vehicle axle 10, as noted above, this will generally be the top or 12:00 o'clock position. The indication of the pointer or needle 94 is then noted and, if desired, recorded by one of the limit or memory hands 96. The roundness gauge 40 is then rotated about the shaft, axle 10 or other component to determine the location of, and more importantly, the extent of wear or run out. The wear or run out is the difference between the initial indicator reading and the maximum or largest variation from the initial reading.

Figure 5A:
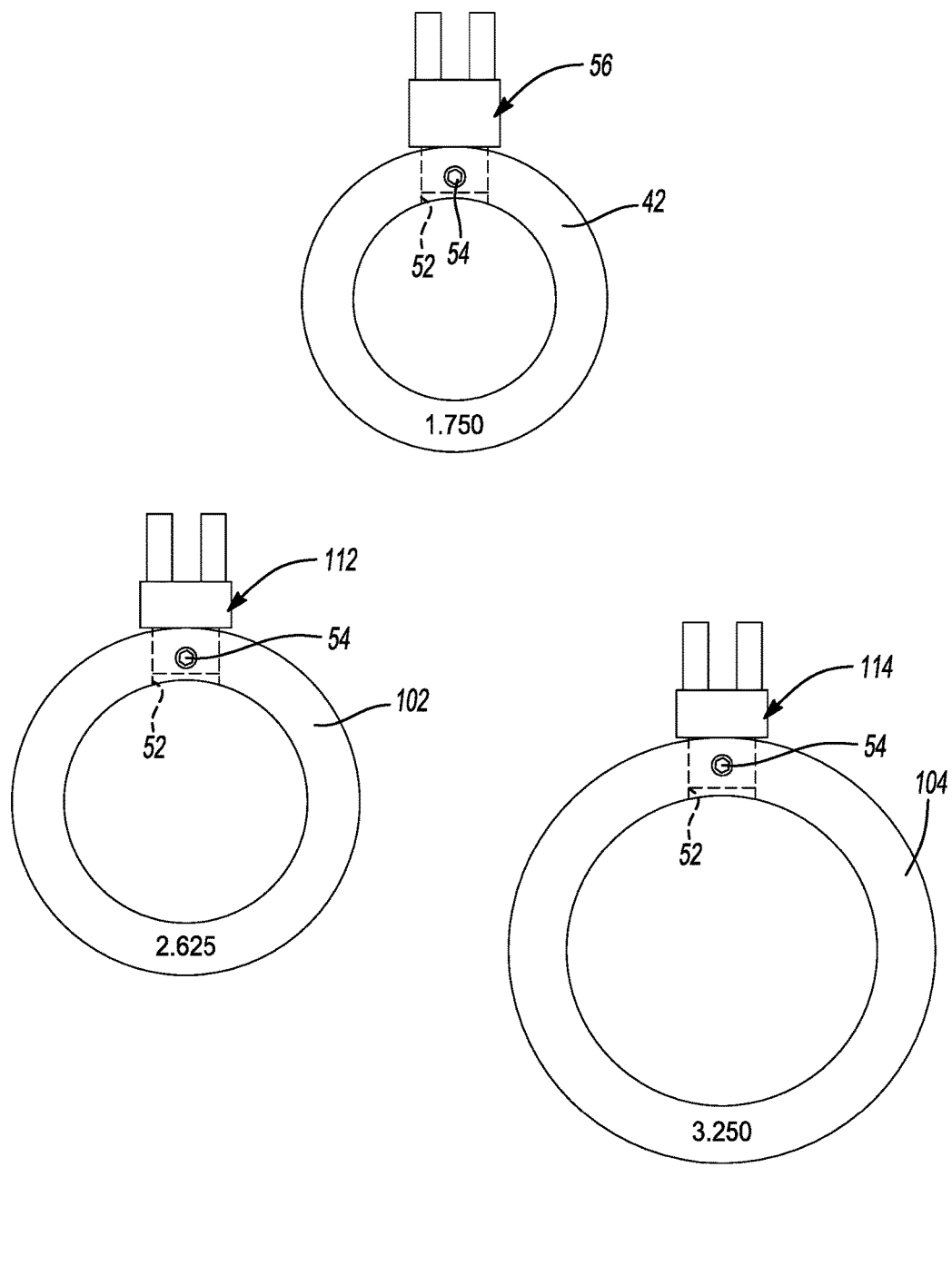
FIGS. 5A and 5B illustrate a plurality of various size rings or collars that are components of the roundness gauge according to the present invention.
Figure 5B:
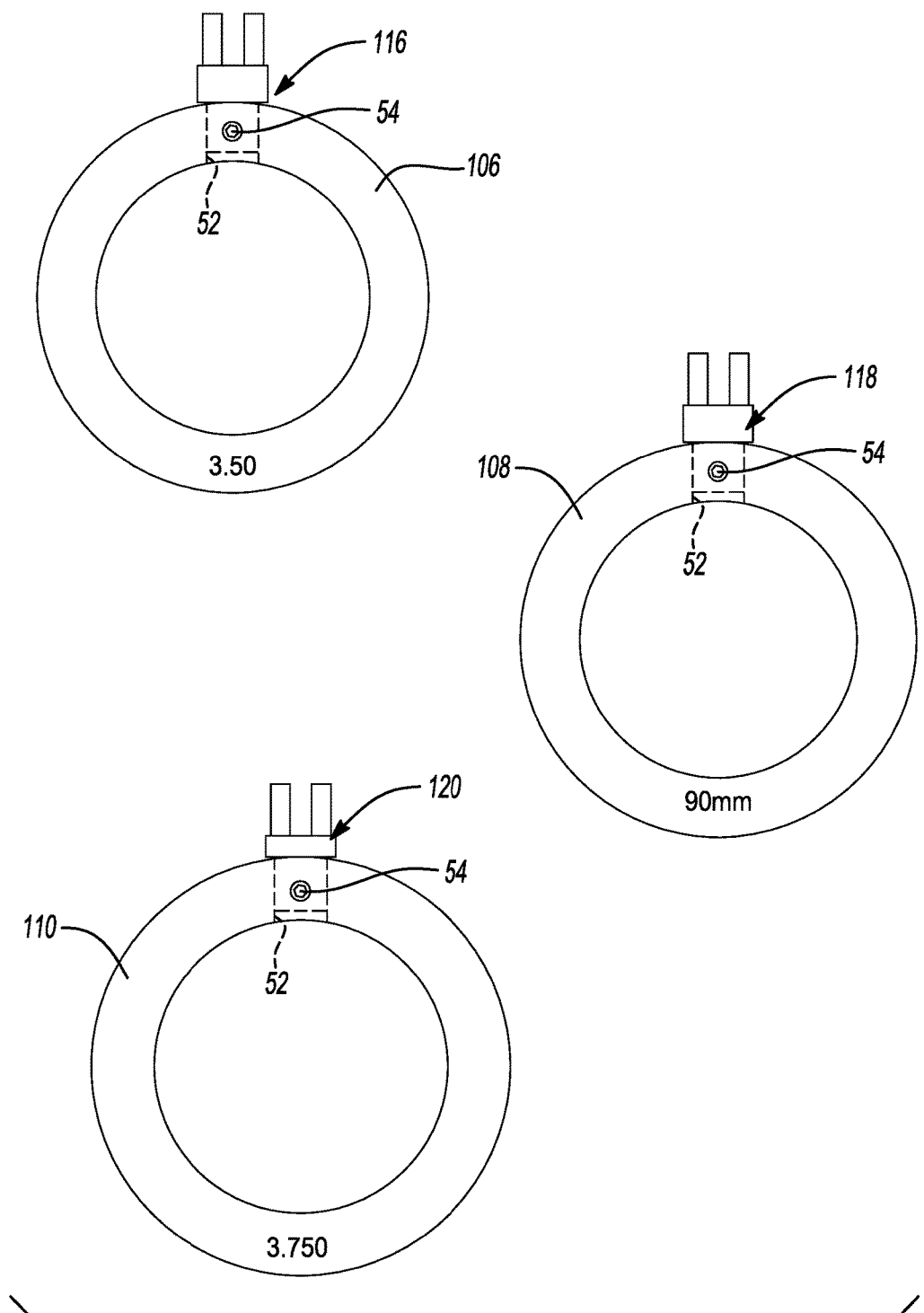

Referring now to FIGS. 1, 3 and 5, it will be appreciated that inasmuch as a roundness gauge 40 having a circular collar or ring 42 defining a center, through cylindrical opening 44 of a specific diameter, such as 1.750 inches, will function, that is, provide the desired roundness measurement, only with a shaft, axle or other circular or cylindrical component having that nominal outside diameter, it is necessary to provide a plurality of circular rings or collars 42 of different inside diameters which can be attached to the dial indicator 80. Accordingly, and as illustrated in FIG. 5, an additional circular collar or ring 102 having an inside diameter of 2.625 inches (66.675 mm.), a circular collar or ring 104 having an inside diameter of 3.250 inches (82.55 mm.), a circular collar or ring 106 having an inside diameter of 3.50 inches (88.9 mm.), a ring or collar 108 having an inside diameter of 3.542 inches (90 mm.) and a circular ring or collar 110 having an inside diameter of 3.750 inches (95.25 mm.) provide functionality for the most commonly encountered shaft, bearing or seal diameters of truck, tractor and trailer axles.

Moreover, because these rings or collars 42, 102, 104, 106, 108 and 110 are fabricated from standard diameter bar stock, it will be appreciated that each of the rings or collars 42, 102, 104, 106, 108 and 110 will typically have different wall or radial thicknesses. For example, the wall thickness of the ring 42 is 0.443 inches, the wall thickness of the ring 102 is 0.562 inches, the wall thickness of the ring 104 is 0.675 inches, the wall thickness of the ring 106 is 0.750 inches, the wall thickness of the ring 108 is 0.759 inches and the wall thickness of the ring 110 is 0.803 inches.

It is therefore necessary that each ring or collar include a different cylindrical collet fitting 56 having an appropriate radial length and depth of counterbore 60 (which determines the location of the shoulder or flange 62) so that the probe housing 82 of the dial indicator 80 and the probe tip 86 are properly located or positioned relative to the inside surface of the through openings in the various rings or collars as noted above so that the roundness gauge 40 may be easily installed on a shaft, axle or other cylindrical component as described above. Specifically, the collet fitting 56 has a long body with a first length of counterbore 60 and is intended for use only with the 1.750 inch ring or collar 42. A second collet fitting 112 has a shorter body with a second length of counterbore 60 and is utilized only with the 2.625 inch ring or collar 102. A third collet fitting 114 includes the same shorter body with a shorter counterbore 60 and is utilized only with the 3.250 inch ring or collar 104. A fourth collet fitting 116 includes the same shorter body with a still shorter counterbore 60 and is utilized only with the 3.50 inch ring or collar 106. A fifth collet fitting 118 includes the same shorter body with an even shorter counterbore 60 and is utilized only with the 90 mm. ring or collar 108. And finally, a sixth collet fitting 120 includes a very short body and a counterbore 60 and is utilized only with the 3.750 inch ring or collar 110. So assembled, the distance "X" referenced in FIG. 4 between the shoulder 62 of the counterbore 60 and the probe tip 86 of the dial indicator 80 will essentially be constant.

It should be understood that the various collet fittings 56, 112, 114, 116, 118 and 120 are intended to be essentially permanently attached or secured to their respective rings or collars through the agency of the set screws 54 while the dial indicator(s) 80 may be removed and installed as needed in the various collet fittings 56, 112, 114, 116, 118 and 120 associated with the rings or collars 42, 102, 104, 106, 108 and 110, respectively.

Moreover, these sizes accommodate the most commonly encountered combinations of inner and outer bearing diameters. For example, a common drive axle inner and outer bearing diameter combination is 3.250 inches and 2.625 inches, respectively. Another common drive axle inner and outer bearing diameter combination is 3.50 inches and 3.750 inches, respectively. A common trailer axle inner and outer bearing diameter combination is 2.625 inches and 3.542 inches, respectively. Notwithstanding this delineation of common axle bearing diameters, it should be understood that the roundness gauge 40 of the present invention only requires fabrication of a ring or collar 42 having a suitable, correspondingly sized inside diameter opening 44 to adapt it to a specific shaft or axle diameter application.

The foregoing description of the invention is merely exemplary in nature and variations that do not depart from the gist of the invention are intended to be within the scope of the invention. Such variations are not to be regarded as a departure from the spirit and scope of the invention.

What is claimed is:

1. A roundness gauge comprising, in combination,
    a ring defining a through cylindrical opening having an inside diameter corresponding to a nominal outside diameter of a surface of an axle or shaft, said ring having a radial through opening,
    a collet fitting disposed in said radial through opening and defining a center, enlarged diameter portion, a passageway, a collet at a first end of said collet fitting, a shoulder at a second end of said collet fitting and a clamp surrounding said collet, and
    a dial indicator having a probe housing and a measuring probe disposed within and extending from said housing,
    said probe housing of said dial indicator disposed within said collet fitting and secured therein by said collet and said clamp.

2. The roundness gauge of claim 1 wherein said measuring probe extends into said through cylindrical opening of said ring.

3. The roundness gauge of claim 1 further including a plurality of rings defining through cylindrical openings of distinct diameters.

4. The roundness gauge of claim 1 wherein said ring includes a flat surface and further including indicia on said flat surface indicating a diameter of said inside diameter of said ring.

5. The roundness gauge of claim 1 wherein said shoulder limits radially inward translation of said probe housing.

6. The roundness gauge of claim 1 wherein said measuring probe includes a hemi-spherical tip.

7. The roundness gauge of claim 1 further including a set screw radially aligned with said radial through opening of said ring for retaining said collet fitting therein.

8. A roundness gauge for determining wear of a shaft or axle comprising, in combination,
    a ring defining a through cylindrical opening having an inside diameter corresponding to a nominal outside diameter of a cylindrical surface of the axle or shaft, said ring having a radial through opening,
    a collet fitting disposed in said radial through opening and defining a center, enlarged portion disposed adjacent an outside surface of said ring, a through cylindrical passageway, a collet at an outer end of said collet fitting, a shoulder at an inner end of said collet fitting and a adjustable clamp surrounding said collet, and
    a dial indicator having a probe housing and a measuring probe disposed within and extending from said housing, said probe housing of said dial indicator disposed within said through cylindrical passageway of said collet fitting and secured therein by said clamp.

9. The roundness gauge of claim 8 wherein said measuring probe extends into said cylindrical opening of said ring.

10. The roundness gauge of claim 8 further including a plurality of rings defining through cylindrical openings of distinct diameters.

11. The roundness gauge of claim 8 wherein said ring includes a flat surface and further including indicia on said flat surface indicating a diameter of said inside diameter.

12. The roundness gauge of claim 8 wherein said shoulder limits radially inward translation of said probe housing.

13. The roundness gauge of claim 8 wherein said measuring probe includes a hemi-spherical tip.

14. The roundness gauge of claim 8 further including a set screw radially aligned with said radial through opening of said ring for retaining said collet fitting therein.

15. A roundness gauge for determining wear of a circular surface comprising, in combination,
   a ring defining a through opening having an inside diameter corresponding to a nominal outside diameter of the circular surface, an outside surface and a radial through opening extending between said through opening and said outside surface,
   a collet fitting disposed in said radial through opening and defining a center, enlarged portion disposed adjacent said outside surface of said ring, a through passageway, a collet disposed about an outer portion of said passageway, a shoulder at an inner portion of said through passageway and a clamp surrounding said collet, and
   a dial indicator having a probe housing and a measuring probe disposed within and extending from said housing, said probe housing of said dial indicator disposed within said through passageway of said collet fitting and selectively secured therein by said clamp.

16. The roundness gauge of claim 15 wherein said measuring probe extends into said through opening of said ring.

17. The roundness gauge of claim 15 further including a plurality of rings defining through cylindrical openings of distinct diameters.

18. The roundness gauge of claim 15 wherein said shoulder limits radially inward translation of said probe housing.

* * * * *